April 19, 1938.   L. VAN R. SMITH   2,114,941
BRAKE SYSTEM FOR TRAILERS
Filed April 3, 1937   2 Sheets-Sheet 2
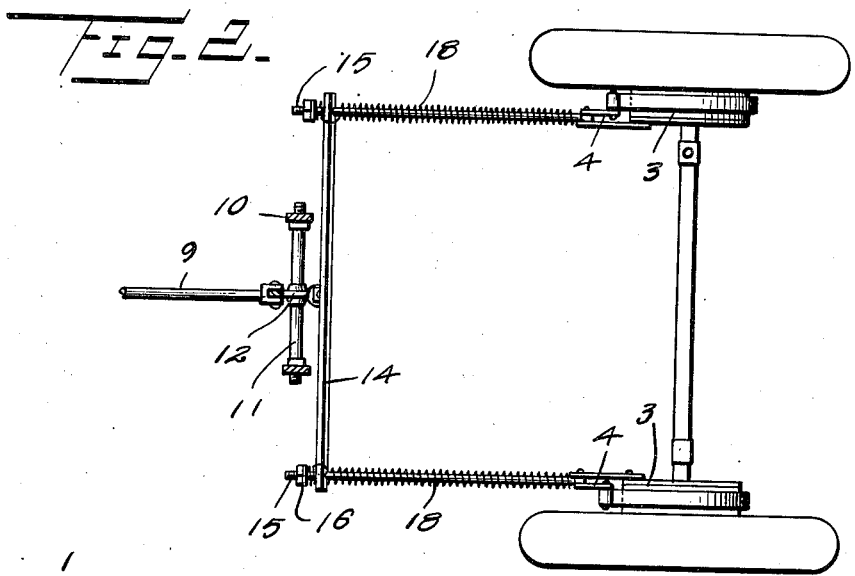
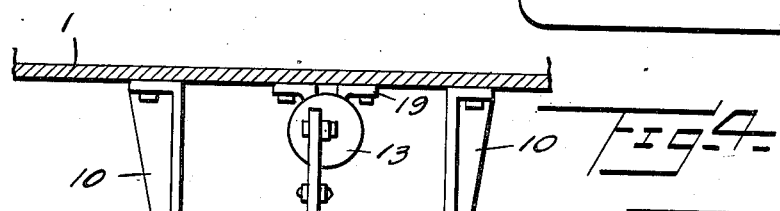
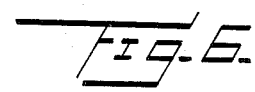
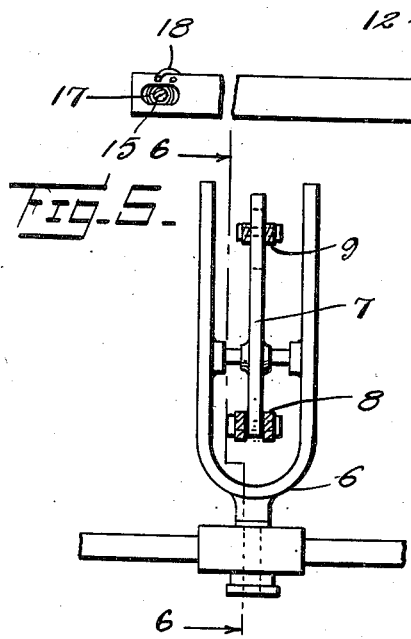
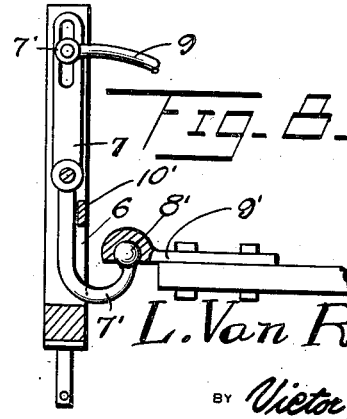
L. Van R. Smith
INVENTOR
BY Victor J. Evans & Co.
ATTORNEY Patented Apr. 19, 1938

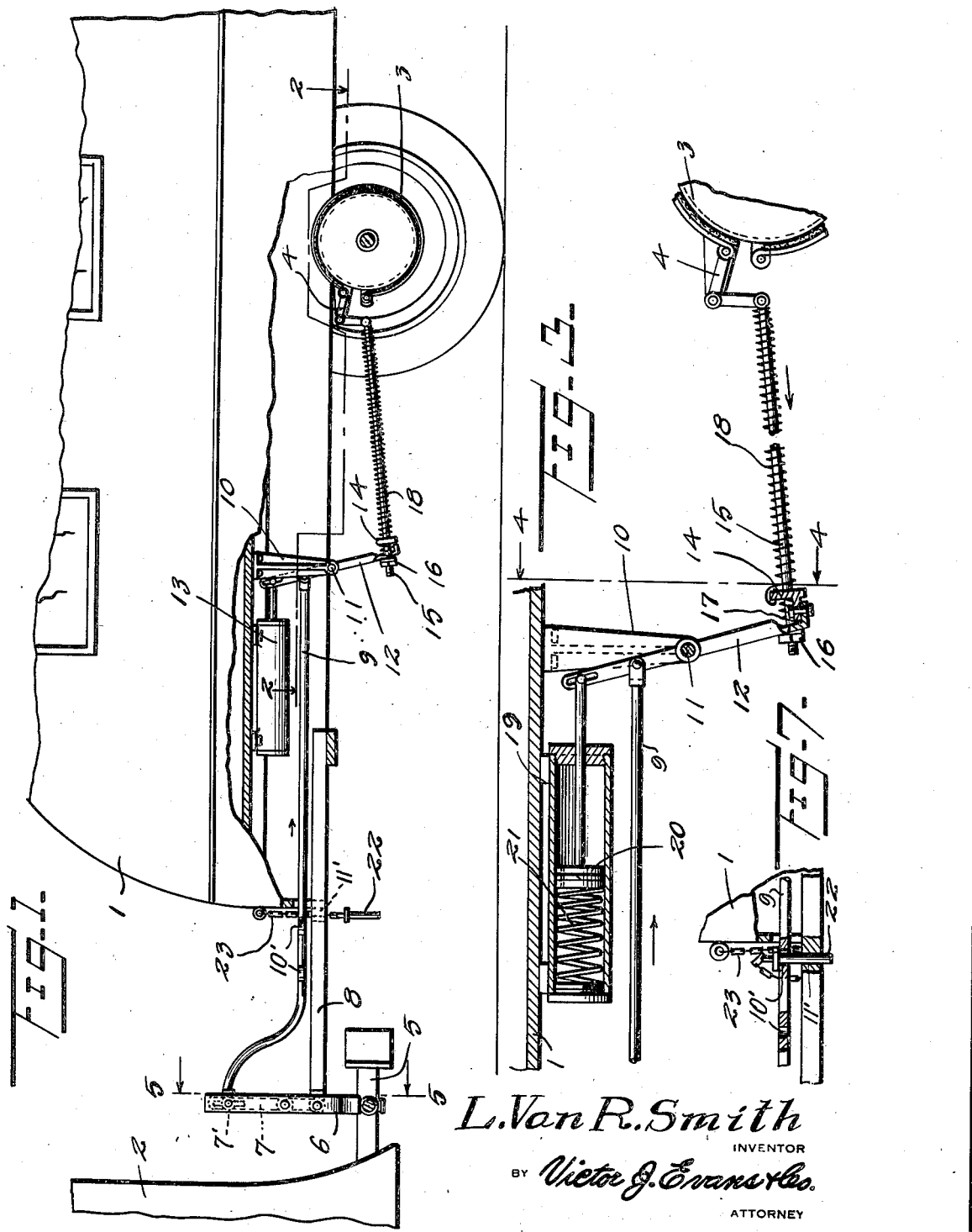

2,114,941

UNITED STATES PATENT OFFICE 2,114,941

BRAKE SYSTEM FOR TRAILERS

Lewis Van R. Smith, Atlanta, Ga.

Application April 3, 1937, Serial No. 134,852

3 Claims. (Cl. 188—142)

This invention relates to brakes for trailers and has for the primary object the provision of a device of this character which will automatically apply the brakes of a trailer proportionately with the force developed by said trailer when the latter shoves the towing vehicle and thereby maintain the speed of the trailer at substantially the same speed of the towing vehicle when descending a hill or grade or when slowing down, providing smoother operation to both the trailer and the towing vehicle.

With these and other objects in view, this invention consists in certain novel features of construction, combination and arrangement of parts to be hereinafter more fully described and claimed.

For a complete understanding of my invention, reference is to be had to the following description and accompanying drawings, in which—

Figure 1 is a fragmentary side elevation partly in section showing a trailer and towing vehicle equipped with my invention.

Figure 2 is a sectional view taken on the line 2—2 of Figure 1.

Figure 3 is a fragmentary vertical sectional view showing my invention in non-brake applying position.

Figure 4 is a sectional view taken on the line 4—4 of Figure 3.

Figure 5 is a sectional view taken on the line 5—5 of Figure 1.

Figure 6 is a sectional view taken on the line 6—6 of Figure 5.

Figure 7 is a fragmentary sectional view illustrating means of retaining the brakes in applied position on the trailer when uncoupled from the towing vehicle.

Figure 8 is a view similar to Figure 6 illustrating a modification of my invention.

Referring in detail to the drawings, the numeral 1 indicates a trailer and 2 a towing vehicle. The trailer or the wheels thereof are equipped with brakes 3, the operating arms of which are indicated by the character 4. A guard 5 in the form of a bumper or similar device is arranged at the rear of the towing vehicle 2 and has journaled thereon a vertically arranged frame 6 and pivoted in said frame is a lever 7, one end of which is pivotally connected to a tongue 8 of the trailer and the other end has a pin and slot connection 7' with an operating rod 9 extending rearwardly over the draft tongue and under the body of the trailer. Secured on the body of the trailer and depending therefrom is a hanger 10 including a journal shaft 11 on which is secured a lever 12. The rear end of the rod 9 is pivoted on the lever 12 above the shaft 11 and the upper end of said lever has a pin and slot connection with a cushioning device 13 mounted on the trailer.

An equalizing bar 14 is pivoted to the lower end of the lever 12 and has openings to slidably receive rods 15. The rods have their rear ends pivoted on the operating arms 4 of the brakes 3. The forward ends of the rods are equipped with stops 16 and interposed between said stops and the equalizing bar are coil springs 17. Connected with the rear ends of the rods 15 and with the equalizing bar 14 are coil springs 18 acting to yieldably connect said equalizing bar with the rods and which will compress under forces from the bar 14 to move the rods for applying the brakes. The springs 17 and 18 are mounted on the rods. This arrangement is to permit the equalizer bar 14 to exert pull on the coil springs until the brakes 3 are operated. As the equalizer bar 14 further advances it takes up against the coil springs 17 thus exerting additional brake pressure until stops 16 are reached. Then full brake pressure is on, or available if needed.

The cushioning device 13 consists of a cylinder 19 in which operates a plunger 20, the stem of which is connected to the lever 12 and interposed between the plunger and one end of the cylinder is a cushion coil type spring 21.

In operation, the towing vehicle tows the trailer by the draft tongue being connected to the lower end of the lever 7, causing said lever to pivot with its lower end swinging rearwardly and its upper end swinging forwardly. The upper end of the lever is resisted in its forward movement by the cushion spring 21 being engaged by the plunger 20. Any tendency of the upper end of the lever 7 to move forwardly brings about a movement of the brakes 3 into off position. When the vehicles are going down grade and the speed of the trailer is greater than the towing vehicle a force is exerted on the lower end of the lever 7 by the tongue moving the upper end of said lever 7 rearwardly, bringing about a sliding movement of the rod 9 rearwardly. The rod 9 moving rearwardly actuates the lever 12 which through the equalizing bar and rods 15 and springs 18 bring about an application of the brakes 3 in proportion to the force developed by the trailer tending to overtake the towing vehicle so that the trailer will be slowed down to a speed approximately the speed of the towing vehicle, consequently bringing about a smoother operation of both the towing vehicle and the trailer. Of course, as soon as the speed of the trailer is below the speed of the towing vehicle the brakes are automatically released.

Should it be desired to secure the brakes 3 in brake applying position when the trailer is uncoupled from the towing vehicle, the rod 9 is provided with openings 10', any one of which may be moved to register with an opening 11' in the draft tongue so that a key 22 may be passed through said openings and thereby retain the brakes applied with variable braking action. The key is connected to the trailer by a flexible element 23.

Referring to Figure 8 which illustrates a slight modified form of my invention the lever 7 has formed thereon a gooseneck 7' provided with a ball 8' capable of fitting in a conventional socket type coupler 9' frequently employed on the draft tongue of a trailer. The frame 6 in the modified form of my invention is provided with a stop strip 10' for limiting the swinging movement of the lever 7 in one direction.

What is claimed is:

1. In combination with a towing vehicle and a trailer having brakes including brake operating arms, a vertically arranged lever pivotally mounted on the towing vehicle, a draft tongue connected with the trailer and with the lower end of said lever, an operating rod pivotally and slidably connected to the upper end of said lever, a second lever pivotally mounted on the trailer and having the operating rod connected thereto, an equalizing bar connected on the second lever, rods connected to the brake operating arms, and slidable through the equalizing bar, stops on said rods, springs interposed between the stops and the equalizing bar, and springs connected to the rods and to the equalizing bar.

2. In combination with a towing vehicle and a trailer having brakes including brake operating arms, a vertically arranged lever pivotally mounted on the towing vehicle, a draft tongue connected with the trailer and with the lower end of said lever, an operating rod pivotally and slidably connected to the upper end of said lever, a second lever pivotally mounted on the trailer and having the operating rod connected thereto, an equalizing bar connected to the second lever, rods connected to the brake operating arms and slidable through the equalizing bar, stops on said rods, springs interposed between the stops and the equalizing bar, springs connected to the rods and to the equalizing bar, and a cushioning device carried by the trailer and connected to the second lever.

3. In combination with a towing vehicle and a trailer having brakes including brake operating arms, a vertically arranged lever pivotally mounted on the towing vehicle, a draft tongue connected with the trailer and with the lower end of said lever, an operating rod pivotally and slidably connected to the upper end of said lever, a second lever pivotally mounted on the trailer and having the operating rod connected thereto, an equalizing bar connected to the second lever, rods connected to the brake operating arms and slidable through the equalizing bar, stops on said rods, springs interposed between the stops and the equalizing bar, springs connected to the rods and to the equalizing bar, a cushioning device carried by the trailer and connected to the second lever, said tongue and operating rod having openings capable of being registered by bringing about application of the brakes, and a key to enter said openings when registered.

LEWIS VAN R. SMITH.